United States Patent Office 3,728,272
Patented Apr. 17, 1973

3,728,272
METHOD OF PRODUCING SODIUM ALUMINUM HYDRIDES
Bohuslav Casensky, 6 E. Krasnohorske, Prague I, Czechoslovakia; Jiri Machacek, 66 Hlavni, Krumvir, Czechoslovakia; and Jaroslav Vit, c/o Peter Andrews, P.O. Box 8145, SW. Station, Washington, D.C. 20024
No Drawing. Application Mar. 24, 1967, Ser. No. 626,664, now Patent No. 3,507,895, dated Apr. 21, 1970, which is a continuation-in-part of abandoned application Ser. No. 611,845, Jan. 26, 1967. Divided and this application Mar. 25, 1970, Ser. No. 22,669
Claims priority, application Czechoslovakia, Jan. 31, 1966, 604/66; Mar. 22, 1966, 1,906/66; Mar. 26, 1966, 2,009/66
Int. Cl. C01b 6/24, 6/28
U.S. Cl. 252—188                 3 Claims

ABSTRACT OF THE DISCLOSURE

Liquid reactant for use in reducing and halogenating reactions comprising a solution in benzene, toluene, xylene or tetrahydrofuran of (a) a compound of the formula $NaAlH_2OR$ wherein

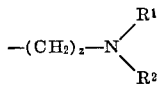

$z$ is 2 to 4 and $R^1$ and $R^2$ are the same or different and are selected from the group consisting of $O(CH_2)_z$, alkyl of 1 to 4 carbon atoms and an aliphatic ether group having a total of 2 to 4 carbon atoms and $z$ has the same meaning as above, or (b) a compound of the formula $NaAlH_x(OR^3)_{4-x}$, wherein $x$ is 1 or 2 and $R^3$ is (alkylene O)$_y$R$^4$, wherein alkylene has 2 to 4 carbon atoms, $y$ is 1 to 4 and $R^4$ is selected from the group consisting of alkyl of 1 to 4 carbon atoms, phenyl,

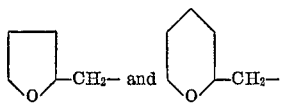

A specific compound coming under the second of these groups is sodium dihydro-bis-(2-methoxy-ethoxy)-aluminate of the formula $NaAlH_2(OCH_2CH_2OCH_3)_2$.

CROSS-REFERENCES TO RELATED APPLICATIONS

The present application is a division of application Ser. No. 626,664 filed Mar. 24, 1967, now Pat. 3,507,895, dated Apr. 21, 1970, which in turn is a continuation-in-part of application Ser. No. 611,845, filed Jan. 26, 1967, now abandoned, all filed by the inventors of the present application.

Another method of making substituted sodium aluminum hydrides has been disclosed and claimed in application Ser. No. 594,971, of Jaroslav Vit et al., filed Nov. 10, 1966, now Pat. 3,652,622, and assigned to the same assignee as the present case.

BACKGROUND OF THE INVENTION

Certain organically substituted sodium aluminum hydrides, for instance sodium aluminum alkoxy hydrides and sodium aluminum aryloxyhydrides, are known and used as specific reducing agents in organic chemistry. It is possible, for instance, by using these compounds as reducing agents to reduce aldehydes, ketones and organic acid esters and chlorides to alcohols, to reduce nitro-compounds to amines and nitriles to aldehydes. Furthermore, these compounds are useful as dehalogenating agents.

Various processes have been described for producing these compounds. One process for obtaining substituted sodium aluminum hydrides has been described in application Ser. No. 594,971, filed Nov. 10, 1966, now Pat. No. 3,652,622.

One of the difficulties encountered in producing the above-described compounds is that they are not prepared from basic reactants, i.e. from aluminum and sodium.

It is therefore an object of the present invention to provide a method of producing organically substituted sodium aluminum hydrides which can be carried out in a simple and economical manner starting from the basic reagents, i.e. from aluminum, sodium and hydrogen.

It is another object of the present invention to provide a method for the direct synthesis of specific organically substituted sodium aluminum hydrides by reaction in an organic aprotic solvent.

In the above-mentioned earlier application Ser. No. 611,845, a method has been disclosed for producing sodium aluminum hydrides of the general formula $Na_{1+n}AlH_xZ_{4-x+n}$, where $x$ is an integral number between 1 and 4, inclusive, and $n$ is zero, wherein $x$ is 6 and $n$ is 2, and Z is selected from the group consisting of Y, Q and W, wherein Y is an organic rest derived by splitting off an active hydrogen atom from a compound selected from the group consisting of:

(1) alcohols and phenols,
(2) tetrahydrofurfuryl alcohols,
(3) ether alcohols obtainable by alkylating one hydroxyl group in doils,
(4) polyether alcohols of the type obtainable by dehydration of tetrahydrofurfuryl alcohols and diols, and wherein Q is an organic rest derived by splitting off an active hydrogen atom from a compound selected from the group consisting of (I)     $HO(C_jH_{2j})_sSR$
(II)    $HO(C_jH_{2j})_sNR_2$
(III)   $HS(C_jH_{2j})_sOR$
(IV)    
(V)     $HS(C_jH_{2j})_sSR$
(VI)    $HS(C_jH_{2j})_sNR_2$ where $j$ is an integral number between 1 and 5, inclusive, and $s$ is an integral number between 1 and 3, inclusive, and wherein R is selected from the group consisting of alkyl, aryl, alkoxyalkyl of the type

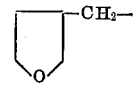

and alkoxyalkyl of the type $CH_3OCH_2CH_2$—, and wherein W is an organic rest derived by splitting off an active hydrogen atom from a compound selected from the group consisting of:

(a) Tetrahydropyranyl alcohols,
(b) Polyether alcohols of the type obtainable by dehydration of tetrahydropyranyl alcohols and diols,
(c) Aminoalcohols of the general formula

wherein R″ and R‴ are each selected from the group consisting of alkoxyalkyl of the formula $R'O(CH_2)_z$ and R′, wherein R′ is selected from the group consisting of alkyls with 1–4 carbon atoms and aryls with 6–8 carbon atoms and wherein $z$ is an integral number between 2 and 4, inclusive, (d) Polyetheralcohols of the type, obtainable by dehydration of polyglycols and etheralcohols, by dehydration of polyglycols and tetrahydrofurfuryl-alcohols, and by dehydration of polyglycols and tetrahydropyranyl alcohols, (e) Polyetheralcohols, of the type obtainable by alkylation of two hydroxyl groups in triols, (f) Polyetheralcohols of the type obtainable by dehydration of polyetheralcohols of paragraph (e) and diols, and by dehydration of polyetheralcohols of paragraph (e) and polyglycols.

The method there disclosed comprises the step of reacting, under hydrogen pressure, at least one compound selected from the group consisting of $NaAlZ_4$, $AlZ_3$, $ZH$, $NaAlH_2Z_2$, $NaAlHZ_3$, $NaHlH_3Z$, $AlHZ_2$ and $AlH_2Z$, wherein Z has the same meaning as above, with aluminum at least one substance selected from the group consisting of sodium, NaZ, and sodium hydride.

In another embodiment of the invention, the reaction is carried out, under hydrogen pressure, between aluminum and at least two substances selected from the group consisting of sodium, NaZ and sodium hydride, it being stipulated that at least one of the said substances must be NaZ, Z having the meaning as above. NaZ must be soluble in benzene or another aprotic solvent.

The present divisional application is directed to a method of making specific compounds coming under the above formula and liquid reactants formed with these compounds.

SUMMARY OF THE INVENTION

The present invention accordingly resides in a process of making a compound selected from the group consisting of (A) compounds of the formula $NaAlH_x(OR)_{4-x}$ wherein R is

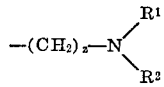

x is 1 or 2, z is an integer from 2 to 4, and $R^1$ and $R^2$ are the same or different and are selected from the group consisting of alkyl of 1 to 4 carbon atoms and an aliphatic ether alkyl group having a total of 2 to 4 carbon atoms and z has the same meaning as above, (B) compounds of the formula $NaAlH_x(OR^3)_{4-x}$, wherein x is 1 or 2 and $R^3$ is (alkylene O)$_y$R$^4$, wherein alkylene has 2 to 4 carbon atoms, y is 1 to 4 and $R^4$ is selected from the group consisting of alkyl of 1 to 4 carbon atoms, phenyl

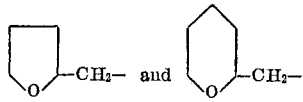

with the proviso that if x is 2 and alkylene has 2 carbon atoms, then $R^4$ shall be other than methyl, the said process comprising hydrogenating sodium, aluminum and (a) in case of compounds A: a compound selected from the group consisting of $AlH_m(OR)_{3-m}$, $NaAlH_m(OR)_{4-m}$, and ROH, R having the meaning as above, (b) in case of compounds B: a compound selected from the group consisting of $AlH_m(OR^3)_{3-m}$, $NaAlH_m(OR^3)_{4-m}$ and $R^3OH$, $R^3$ having the same meaning as above and m in both cases being 0, 1 or 2, the said reaction being carried out at an elevated temperature and pressure in an inert aromatic hydrocarbon or ether medium, and the ratio of Na to R in the reaction being between 1:1 and 1:3.

The invention also embraces liquid reactants comprising solutions of the above compounds I or II in an aromatic monocyclic hydrocarbon, or ether compound.

DESCRIPTION OF THE PREFERRED EMBODIMENTS

The organic starting compounds which may be used as reactants, as will be described in detail further below may be prepared by the reaction of the respective alcohol with the metal, i.e. with sodium or aluminum, or with the respective hydride, i.e. with sodium hydride or aluminum hydride. There is no difficulty involved in preparing the thioalkoxy, dialkylamino and alkylamino substituted derivatives. In the case of the preparation of the thioalcoholates, however, it is recommended to start from the more reactive hydrides NaH and $AlH_3$ instead of the metals.

The reactions, generally, may be carried out in liquid media, such as hydrocarbons, ethers (diethyl ether, monoglyme, tetrahydrofurane) using an excess of the ZH compounds, so as to prepare the compounds in satisfactory yields.

The thus formed compounds are insoluble in the reaction medium and thus will be formed as a suspension.

The thus formed suspension in a liquid reaction medium may be used directly as a mixture of NaZ and ZH or $AlZ_3$ and ZH, respectively, Z having the meaning as given in the background discussion, without any further purification or isolation, for the direct synthesis of the present invention; in the case of the preparation of the NaZ and $AlZ_3$ compounds, without excess of the ZH compound, atomic metal, i.e. sodium or aluminum will be in the liquid reaction mixture. The presence of these metals in said reaction mixture is of no inconvenience in the preparation of the sodium aluminum hydrides of the formula $$Na_{1+n}AlH_xZ_{4-x+n}$$

according to the present invention, since they represent one of the reactants. Thus, the crude reaction mixture obtained from the preparation of NaZ or $AlZ_3$ may be used so that the isolation of NaZ and $AlZ_3$ seems rather unnecessary.

Another advantageous method of producing aluminum alcoholates and thioalcoholates of the type $AlZ_3$ is based on the following equilibrium reactions:

(1) $Al(OCH_3)_3 + ZH \leftrightarrow AlZ_3 + 3CH_3OH$ (2) $Al(OR_3)_3 + ZH \leftrightarrow AlZ_3 + 3ROH$ wherein R is the same as above. It is advisable to use an excess of ZH and to carry out the reaction under simultaneous removal of $CH_3OH$ or ROH, the boiling point of which must be lower than that of ZH, which usually will be the case. The stripping off of the $CH_3OH$ or ROH may be conveniently carried out by using a rectification column. The starting aluminum alcoholates to carry out the reactions (1) and (2) are easily accessible in a pure state, even on an industrial scale. To start from $Al(OCH_3)_3$ seems to be most advantageous, since the same is insoluble, e.g. in hydrocarbons, thus facilitating the separation of any unaltered portion thereof from the reaction mixture. The product $AlZ_3$ may be isolated by simply stripping off the ROH and the excess of ZH.

The starting compound of the type $NaAlZ_4$ may be prepared by the reactions accounted for as follows:

(3) $Na + Al + 4ZH \rightarrow NaAlZ_4 + 2H_2$ (4) $NaH + AlH_3 + 4ZH \rightarrow NaAlZ_4 4H_2$ (5) $NaAlH_4 + 4ZH \rightarrow NaAlZ_4 4H_2$ (6) $NaAl(OCH_3)_4 + 4ZH \rightarrow NaAlZ_4 + 4CH_3OH$ The complex alcoholates of the type $NaAlZ_4$ are generally easily soluble in ethers and some of them even in aromatic hydrocarbons.

The alcoholates of the type $NaAlZ_4$ may also be readily prepared by addition of NaZ to $AlZ_3$ in a medium, in which at least one of the compounds $AlZ_3$ and NaZ is soluble.

The preparation of the compounds of the type $AlH_2Z$ and $AlHZ_2$, wherein Z is alkoxy or aroxy is described in German Pat. 1,085,515 and in a similar manner, all compounds of the type $AlHZ_2$ and $AlH_2Z$ may be prepared such as:

(7) $AlZ_qX_{3-q} + (3-q)NaH \rightarrow AlZ_qH_{3-q} + (3-q)NaX$ wherein X is halogen and $q$ is 1 or 2. As for the compounds of the formula $AlZ_qX_{3-q}$, they are readily accessible, e.g. by the reaction:

(8) $qAlZ_3 + (3-q)AlX_3 \xrightarrow{(C_2H_5)_2O} AlZ_qX_{3-q}$

There is, of course, another way to prepare compounds of the type $AlH_2Z$ and $AlHZ_2$, which is shown by the following equation:

(9) $AlH_3 + qZH \xrightarrow{(C_2H_5)_2O} AlZ_qH_{3-q} + qH_2$

There exists also the possibility of converting the compounds of the type $NaAlH_yZ_{4-y}$, wherein $y \neq x = 1, 2$ or 3 into the compounds of the general formula $$Na_{1+n}AlH_xZ_{4-x+n}$$

wherein $x = y$, but otherwise has the same meaning as above, and wherein Z and $n$ each have the same meaning as above.

Some methods of preparation of the starting compounds of the type $NaAlH_yZ_{4-y}$ are disclosed in the German Pat. 1,085,515, and are also described in U.S. application Ser. No. 594,971.

The general method is further illustrated by the following Equations 10–53, assuming that in the said equations the number of moles of Al, Na, NaZ or NaH, respectively, is greater than zero, or, in the case of adding two or more of the equations together, on the assumption that $\Sigma Al$, $\Sigma Na$, $\Sigma NaZ$, $\Sigma NaH$, respectively, in the thus added equations is greater than zero.

(10): $(4-x)AlZ_3 + (3+g)Na + (x+g-1)Al + (1.5x+2g)H_2 \rightarrow 3NaAlH_xZ_{4-x} + gNaAlH_4$ (11): $(4-x)AlZ_3 + (3+g)NaH + (x+g-1)Al + 1.5(x-1+g)H_2 \rightarrow 3NaAlH_xZ_{4-x} + gNaAlH_4$ (12): $(4-x)AlZ_3 + 3(1+g)Na + (x+g-1)Al + 1.5(x+2g)H_2 \rightarrow 3NaAlH_xZ_{4-x} + gNa_3AlH_6$ (13): $(4-x)AlZ_3 + 3(1+g)NaH + (x+g-1)Al + 1.5(x-1+g)H_2 \rightarrow 3NaAlH_xZ_{4-x} + gNa_3AlH_6$ (14): $(4-x)NaAlZ_4 + (x+g)Na + (x+g)Al + 2(x+g)H_2 \rightarrow 4NaAlH_xZ_{4-x} + gNaAlH_4$ (15): $(4-x)NaAlZ_4 + (x+g)NaH + (x+g)Al + 1.5(x+g)H_2 \rightarrow 4NaAlH_xZ_{4-x} + gNaAlH_4$ (16): $(4-x)NaAlZ_4 + (x+3g)Na + (x+g)Al + (2x+3g)H_2 \rightarrow 4NaAlH_xZ_{4-x} + gNa_3AlH_6$ (17): $(4-x)NaAlZ_4 + (x+3g)NaH + (x+g)Al + 1.5(x+g)H_2 \rightarrow 4NaAlH_xZ_{4-x} + gNa_3AlH_6$ (18): $(1+g)Na + (4-x)ZH + (1+g)Al + (x-2+2g)H_2 \rightarrow NaAlH_xZ_{4-x} + gNaAlH_4$ (19): $(4-x)ZH + (1+g)NaH + (1+g)Al + (x-2.5+1.5g)H_2 \rightarrow NaAlH_xZ_{4-x} + gNaAlH_4$ (20): $(4-x)ZH + (1+3g)Na + (1+g)Al + (x-2+3g)H_2 \rightarrow NaAlH_xZ_{4-x} + gNa_3AlH_6$ (21): $(4-x)ZH + (1+3g)NaH + (1+g)Al + (x-2.5+1.5g)H_2 \rightarrow NaAlH_xZ_{4-x} + gNa_3AlH_6$ (22): $(4-x)AlH_2Z + (5-x+g)Na + (1+g)Al + (4-0.5x+2g)H_2 \rightarrow (4-x+g)NaAlH_4 + NaAlH_xZ_{4-x}$ (23): $(4-x)AlH_2Z + (5-x+g)NaH + (1+g)Al + 1.5(1+g)H_2 \rightarrow (4-x+g)NaAlH_4 + NaAlH_xZ_{4-x}$ (24): $(4-x)AlH_2Z + (13-3x+3g)Na + (1+g)Al + (8-1.5x+3g)H_2 \rightarrow (4-x+g)Na_3AlH_6 + NaAlH_xZ_{4-x}$ (25): $(4-x)AlH_2Z + (13-3x+3g)NaH + (1+g)Al + 1.5(1+g)H_2 \rightarrow (4-x+g)Na_3AlH_6 + NaAlH_xZ_{4-x}$ (26): $(4-x)AlHZ_2 + (5-x+g)Na + (1+g)Al + (4-2g-0.5x)H_2 \rightarrow (3-x+g)NaAlH_4 + 2NaAlH_xZ_{4-x}$ (27): $(4-x)AlHZ_2 + (5-x+g)NaH + (1+g)Al + 1.5(1+g)H_2 \rightarrow (3-x+g)NaAlH_4 + 2NaAlH_xZ_{4-x}$ (28): $(4-x)AlHZ_2 + (11-3x+3g)Na + (1+g)Al + (7-1.5x+3g)H_2 \rightarrow (3-x+g)Na_3AlH_6 + 2NaAlH_xZ_{4-x}$ (29): $(4-x)AlHZ_2 + (11-3x+3g)NaH + (1+g)Al + 1.5(1+g)H_2 \rightarrow (3-x+g)Na_3AlH_6 + 2NaAlH_xZ_{4-x}$ (30): $(4-x)NaAlHZ_3 + (x-1+g)Na + (x-1+g)Al + 2(x-1+g)H_2 \rightarrow 3NaAlH_xZ_{4-x} + gNaAlH_4$ (31): $(4-x)NaAlHZ_3 + (x-1+g)NaH + (x-1+g)Al + 1.5(x-1+g)H_2 \rightarrow 3NaAlH_xZ_{4-x} + gNaAlH_4$ (32): $(4-x)NaAlHZ_3 + (x-1+3g)Na + (x-1+g)Al + (2x-2+3g)H_2 \rightarrow 3NaAlH_xZ_{4-x} + gNa_3AlH_6$ (33): $(4-x)NaAlHZ_3 + (x-1+3g)NaH + (x-1+g)Al + 1.5(x-1+g)H_2 \rightarrow 3NaAlH_xZ_{4-x} + gNa_3AlH_6$ (34): $(4-x)NaAlH_2Z_2 + (x-2+g)Na + (x-2+g)Al + 2(x-2+g)H_2 \rightarrow 2NaAlH_xZ_{4-x} + gNaAlH_4$ (35): $(4-x)NaAlH_2Z_2 + (x-2+g)NaH + (x-2+g)Al + 1.5(x-2+g)H_2 \rightarrow 2NaAlH_xZ_{4-x} + gNaAlH_4$ (36): $(4-x)NaAlH_2Z_2 + (x-2+3g)Na + (x-2+g)Al + (2x-4+3g)H_2 \rightarrow 2NaAlH_xZ_{4-x} + gNa_3AlH_6$ (37): $(4-x)NaAlH_2Z_2 + (x-2+3g)NaH + (x-2+g)Al + 1.5(x-2+g)H_2 \rightarrow 2NaAlH_xZ_{4-x} + gNa_3AlH_6$ (38): $(4-x)NaAlH_3Z + (x-3+g)Na + (x-3+g)Al + 2(x-3+g)H_2 \rightarrow NaAlH_xZ_{4-x} + gNaAlH_4$ (39): $(4-x)NaAlH_3Z + (x-3+g)NaH + (x-3+g)Al + 1.5(x-3+g)H_2 \rightarrow NaAlH_xZ_{4-x} + gNaAlH_4$ (40): $(4-x)NaAlH_3Z + (x-3+3g)Na + (x-3+g)Al + (2x-6+3g)H_2 \rightarrow NaAlH_xZ_{4-x} + gNa_3AlH_6$ (41): $(4-x)NaAlH_3Z + (x-3+3g)NaH + (x-3+g)Al + 1.5(x-3+g)H_2 \rightarrow NaAlH_xZ_{4-x} + gNa_3AlH_6$ (42): $3NaZ + (x+g)Al + (3-x)AlZ_3 + gNa + (1.5x+2g)H_2 \rightarrow 3NaAlH_xZ_{4-x} + gNaAlH_4$ (43): $3NaZ + (x+g)Al + (3-x)AlZ_3 + 3gNa + (1.5x+3g)H_2 \rightarrow 3NaAlH_xZ_{4-x} + gNa_3AlH_6$ (44): $xNaZ + (3-x)NaAlZ_4 + (g+x)Al + gNa + (1.5x+2g)H_2 \rightarrow 3NaAlH_xZ_{4-x} + gNaAlH_4$ (45):
$$x\text{NaZ} + (3-x)\text{NaAlZ}_4 + (x+g)\text{Al} + 3g\text{Na} + (1.5x+3g)$$
$$\text{H}_2 \to 3\text{NaAlH}_x\text{Z}_{4-x} + g\text{Na}_3\text{AlH}_6$$

(46):
$$\text{NaZ} + (1+g)\text{Al} + (3-x)\text{ZH} + g\text{Na} + (x-1.5+2g)$$
$$\text{H}_2 \to \text{NaAlH}_x\text{Z}_{4-x} + g\text{NaAlH}_4$$

(47):
$$\text{NaZ} + (1+g)\text{Al} + (3-x)\text{ZH} + 3g\text{Na} + (x-1.5+3g)$$
$$\text{H}_2 \to \text{NaAlH}_x\text{Z}_{4-x} + g\text{Na}_3\text{AlH}_6$$

(48):
$$2\text{NaZ} + \text{Al} + \text{AlHZ}_2 + 1.5\text{H}_2 \to 2\text{NaAlH}_2\text{Z}_2$$

(49):
$$\text{NaZ} + \text{Al} + \text{NaAlHZ}_3 + 1.5\text{H}_2 \to 2\text{NaAlH}_2\text{Z}_3$$

(50):
$$(4-x)\text{NaZ} + (x+3g)\text{Na} + (2+g)\text{Al} + (3+0.5x+3g)$$
$$\text{H}_2 \to \text{NaAlH}_x\text{Z}_{4-x} + (1+g)\text{Na}_3\text{AlH}_6$$

(51):
$$(4-x)\text{NaZ} + (x+3g)\text{NaH} + (2+g)\text{Al} + 1.5(2+g)$$
$$\text{H}_2 \to \text{NaAlH}_x\text{Z}_{4-x} + (1+g)\text{Na}_3\text{AlH}_6$$

(52):
$$(4-x)\text{NaZ} + (1+g)\text{Na} + (5-x+g)$$
$$\text{Al} + (8-1.5x+2g)\text{H}_2 \to$$
$$\text{NaAlH}_x\text{Z}_{4-x} + (4-x+g)\text{NaAlH}_4$$

(53):
$$(4-x)\text{NaZ} + (1+g)\text{NaH} + (5-x+g)$$
$$\text{Al} + 1.5(5-x+g)\text{H}_2 \to$$
$$\text{NaAlH}_x\text{Z}_{4-x} + (4-x+g)\text{NaAlH}_4$$

In Equations 10 to 53, $g$ is any number between zero, inclusive, and fifty times the number of moles of the group Z entering the reaction, preferably between zero, inclusive, and five times the number of moles of the group Z entering the said reaction; $x$ is an integral number between 1 and 3, inclusive. The range of $g$ and $x$ is given on the assumption, again, that the sum of the number of moles, $\Sigma\text{Na}$, $\Sigma\text{NaH}$, and $\Sigma\text{NaZ}$ is greater than zero and that also the number of moles of Al is greater than zero. This is not the case, for instance, if any of the Equations 10 to 13 has the values $x=1$ and $g=0$. However, if Equations 10 to 13 are combined with any of the Equations 14 to 53 that are not excluded if $x=1$ and $g=0$, the thus added Equation 10 to 13 will then also be practicable according to this invention and will fall within the scope of the same even though $x=1$ and $g=0$. Similarly, in the Equations 10 to 13 and 30 to 41, the $g(x)$ values must always be chosen to satisfy the basic condition of the present invention, i.e., that at least one of the substances selected from the group consisting of Na, NaH and NaZ, a certain amount of aluminum, and at least one of the compounds selected from the group consisting of $\text{AlZ}_3$, $\text{NaAlZ}_4$, ZH, $\text{AlH}_2\text{Z}$, $\text{AlHZ}_2$, and $\text{NaAlH}_y\text{Z}_{4-y}$ are present in the reaction mixture ($y$ being an integral number between 1 and 3 that is different from $x$).

In contradistinction thereto, the number of moles of hydrogen entering into any of the reactions illustrated by Equations 10 to 53 may possibly be zero provided that the aforementioned conditions are satisfied. The presence of hydrogen under superatmospheric pressure, however, is a necessary condition; the hydrogen present need not necessarily be consumed by the reaction.

Combinations of these equations are also possible. However, it will be understood that it is practically impossible to give here all possible combinations.

The following example of combining the Equations 14, 31, 42 and 48 together is illustrative only, without, however, limiting the invention to the specific details thereof (54):
$$5\text{NaZ} + (4-x)\text{NaAlZ}_4 + \text{AlHZ}_2 + (x-1+g)$$
$$\text{NaH} + (x+2g)\text{Na} + (3x+3g)\text{Al} + (3-x)\text{AlZ}_3 + (4-x)$$
$$\text{NaAlHZ}_3 + (5x+5.5g)\text{H}_2 \to 10\text{NaAlH}_x\text{Z}_{4-x} + 2\text{NaAlH}_2\text{Z}_2$$
$$+ 3g\text{NaAlH}_4$$

Example XXXVII below was carried out following this equation after insertion of 2 for $x$ and of zero for $g$.

Various other combinations of the Equations 10 to 53 are specifically carried out and described in Examples VIII, XII, XVI, XXIII, XXXI, and XXXIV, below.

For practical purposes, however, working with one starting reactant only, selected from each of the two respective groups, and with aluminum, seems to be the most simple and suitable manner of carrying out the invention is to use one and only one of the Equations 10 to 53 at the same time. A combination thereof, however, may sometimes prove useful.

Thus, by means of the reactions 10 to 53 there may be obtained (I) substituted chemically distinct hydrides $\text{NaAlH}_x\text{Z}_{4-x}$,
(II) mixtures of substituted hydrides $\text{NaAlH}_x\text{Z}_{4-x}$,
(III) mixtures of substituted hydrides, the latter being selected from the group consisting of $\text{Na}_3\text{AlH}_6$ and $\text{NaAlH}_4$, wherein Z has the same meaning as above and $x$ is an integral number between 1 and 3, inclusive. Whether only substituted hydrides $\text{NaAlH}_x\text{Z}_{4-x}$ are obtained, or whether the said hydrides result as a mixture with non-substituted hydrides selected from the group consisting of $\text{Na}_3\text{AlH}_6$ and $\text{NaAlH}_4$ depends primarily on the choice of the Equations 10 to 53, based on which the reaction is carried out, secondarily on the choice of the values for $x$ and $g$ which are inserted into the selected equation. There are certain equations among Equations 10 to 53 which—provided they are not combined with other equations—will yield exclusively mixtures of substituted and non-substituted hydrides; preparation of substituted hydrides $\text{NaAlH}_x\text{Z}_{4-x}$ only is not practical following these equations.

Any of the reactions 10 to 53 or any of their combinations may be carried out in an aprotic solvent.

The aprotic solvent medium, in which the above-described reactions of the present invention are carried out, is preferably selected from the group consisting of hydrocarbons and ethers; the preferred aprotic solvent is benzene or toluene; however, any of the aprotic solvents described may be used.

A preferred embodiment of the invention comprises carrying out the reaction at a temperature of 80 to 220° C., preferably at 100 to 200° C., and at a hydrogen pressure between 2 and 200 atmospheres.

That the reactions of the present invention and the isolation of the products are subject to conversions of the following type which cannot be prevented must be kept in mind in the interpretation of Equations 10 to 54 and their combinations:

(55):
$$(4-x)\text{NaAlH}_c\text{Z}_{4-c} \rightleftharpoons (c-x)\text{NaAlH}_4$$
$$+ (4-c)\text{NaAlH}_x\text{Z}_{4-x}$$

for $x=1$ or 2 and $c=2$ or 3 ($c \neq x$).

(56):
$$4\text{NaAlH}_x\text{Z}_{4-x} \rightleftharpoons x\text{NaAlH}_4 + (4-x)\text{NaAlZ}_4$$

for $x=1$, 2 or 3.

They are readily soluble in non-polar aprotic solvents, such as aromatic hydrocarbons, whereby the field of their possible application is increased, as has been disclosed in detail in U.S. application 594,971.

The following examples illustrate in detail various embodiments which fall within the scope of the invention.

EXAMPLE I

Into a pressure vessel of 2.5 liters volume were charged 18 g. sheet aluminum (as usually used in the preparation of aluminum alcoholates) i.e. 0.66 mol, 46 g. sodium (2 moles), 336 g. of $\text{Al}(\text{OCH}_2\text{CH}_2\text{OCH}_3)_3$ (i.e. 1.33 moles), and 600 ml. benzene. Eight balls were inserted into the pressure vessel to effect stirring of the reaction mixture.

Hydrogen was introduced into the pressure vessel to establish a pressure of 100 atmospheres. The reaction was carried out at 190° C. across 6 hours. Subsequent to filtration, and after evaporation of benzene, 396.3 g. of NaAlH$_2$(OCH$_2$CH$_2$OCH$_3$)$_2$ were isolated from the reaction mixture, i.e. 98.1% of the theory.

EXAMPLE II

Into the same pressure vessel as described in Example I were charged 350 g. of NaAl(OCH$_2$CH$_2$OCH$_3$)$_4$, i.e. 1 mol, 23 g. of sodium (1 mol), 27 g. of aluminum (1 mol) and 600 ml. of benzene. The reaction was carried out similarly under substantially the same reaction conditions as described in Example I. Isolation yielded 397.1 g. of NaAlH$_2$(OCH$_2$CH$_2$OCH$_3$)$_2$, which corresponds to 98.3% of the theory.

EXAMPLE III

The same pressure vessel as described in Example I was charged with 46 g. sodium (2 moles), 54 g. aluminum (2 moles, 304 g. CH$_3$—O—CH$_2$CH$_2$OH (4 moles)) and 600 ml. benzene. The reaction mixture was heated to 100° C. First, hydrogen was released through the reaction; subsequently, the reaction mixture was heated to 190° C. and hydrogen was consumed at this temperature. Upon heating over a period of 3 hours, the desired pressure was reestablished, the heating continued for another 4 hours, and the reaction discontinued. In a conventional manner the compound of the formula NaAlH$_2$(OCH$_2$CH$_2$OCH$_3$)$_2$ was isolated, 396.8 g. of the said product obtained, i.e., 98.2% of the theory.

EXAMPLE IV

Into a pressure vessel of 2.5-liter volume were charged 20.4 g. of powdered aluminum of 88.23% purity (containing 11.77% aluminum oxide), 46 g. sodium (2 moles), 387 g. Al(OCH$_2$CH$_2$N(CH$_3$)$_2$)$_3$, i.e. 1.33 moles, and 600 ml. benzene. Eight balls were inserted into the pressure vessel for stirring of the reaction mixture. Hydrogen was fed into the vessel to establish a pressure of 100 atmospheres. The reaction was then carried out at a temperature of 180° C. for a period of 2 hours. Subsequent to filtration and evaporation of benzene, 443.3 g. of NaAlH$_2$(OCH$_2$CH$_2$N(CH$_3$)$_2$)$_2$ was isolated from the reaction mixture, which corresponds to 98.2% of the theory.

EXAMPLE V

The same pressure vessel as in Example IV was charged with 402 g. NaAl(OCH$_2$CH$_2$N(CH$_3$)$_2$)$_4$, i.e., 1 mol, 23 g. sodium (1 mole), 30.6 g. aluminum of 88.23% purity (1 mol), and 600 ml. benzene. Under conditions identical to those of Example IV, 443.7 g. of NaAlH$_2$(OCH$_2$CH$_2$N(CH$_3$)$_2$)$_2$, which corresponds to 98.3% of the theoretical yield.

EXAMPLE VI

Into the same pressure vessel as described in Example I were charged 46 g. sodium (2 moles), 61.2 g. aluminum of 88.22% purity (2 moles), containing 11.28% of aluminum oxide, 356 g. (CH$_3$)$_2$NCH$_2$CH$_2$OH and 600 ml. benzene. A pressure of 50 atmospheres was established in the pressure vessel prior to heating. The pressure vessel was heated for 3 hours, at 180° C. The reaction was discontinued; 442.8 g. of NaAlH$_2$(OCH$_2$CH$_2$N(CH$_3$)$_2$)$_2$ was isolated, i.e., 98.1% of the theoretical yield.

EXAMPLE VII

Into a rotary pressure vessel, as described in Example I, were charged 30.6 g. aluminum powder of 88.23% purity (1 mole), 23 g. sodium (1 mole), 64.1 g. of methyl alcohol (2 moles) and 600 ml. toluene. A stirring bar was inserted into the pressure vessel for stirring the reaction mixture and hydrogen was introduced to establish a pressure of 80 atmospheres. The reaction was carried out at a temperature of 170° C. for a period of 2½ hours. Toluene was stripped off and 110.8 g. of NaAlH$_2$(OCH$_3$)$_2$ was extracted with tetrahydrofurane from the reaction mixture, i.e. 97.2% of the theoretical yield.

EXAMPLE VIII

Into the pressure vessel as referred to in Example VII were charged 30.6 g. of aluminum powder (88.23% purity) i.e. 1 mole, 46 g. of sodium (2 moles), 138.21 g. ethyl alcohol (3 moles), 162 g. Al(OC$_2$H$_5$)$_3$, and 600 ml. benzene. Upon treatment of the reaction mixture in the manner described in Example VII, 359.72 g. of NaAlH(OC$_2$H$_5$)$_3$ was obtained, which corresponds to 96.7% of the theoretical yield.

EXAMPLE IX

Into the pressure vessel as referred to in Example VII were charged 113.7 g. NaAl(O(CH$_2$)$_5$CH$_3$)$_4$, i.e., 0.25 mole, 17.25 g. of sodium (0.75 mole), 23 g. aluminum powder of 88.23% purity (0.75 mole) and 600 ml. benzene. Eight steel balls were inserted into the pressure vessel for stirring of the reaction mixture and a pressure of 100 atm. was established in the pressure vessel by introduction of hydrogen. The reaction was carried out at 170° C. for a period of 3.5 hours. 149.7 g. of NaAlH$_3$O(CH$_2$)$_5$CH$_3$ was obtained, i.e. 97.1% of the theoretical yield.

EXAMPLE X

The pressure vessel as referred to in Example VII was charged with 30.6 g. aluminum powder of 88.23% purity (1 mole), 23 g. of sodium (1 mole), 188.2 g. phenol (2 moles) and 500 ml. benzene. The reaction was carried out at 185° C. for a period of 4 hours, in the manner described in Example VII. Benzene was stripped off, and 225.1 g.

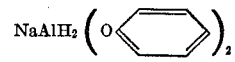

was obtained, i.e., 94.5% of the theoretical yield.

EXAMPLE XI

The pressure vessel referred to in Example VII was charged with 23 g. sodium, 30.6 g. aluminum powder of 88.23% purity (1 mole), 216 g. p-cresol (2 moles). The reaction and isolation was carried out in the manner described in Example X; 255 g. of NaAlH$_2$(OC$_6$H$_4$CH$_3$) was isolated, i.e., 95.8% of the theoretical amount of the product was recovered.

EXAMPLE XII

The pressure vessel as referred to in Example VII was charged with 11.5 g. sodium (0.5 mole), 15.3 g. aluminum powder of 88.23% purity (0.5 mole), 62 g. of

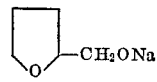

(0.5 mole), 165 g. of

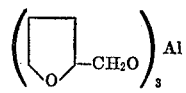

and 600 ml. toluene. Under conditions identical with those described in Example X,

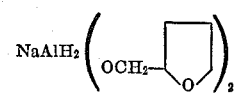

was prepared and 249 g. of the product recovered, i.e., 98% of the theoretical yield.

EXAMPLE XIII

The pressure vessel referred to in Example VII was charged with 23 g. of sodium (1 mole), 30.6 g. aluminum powder of 88.23% purity (1 mole), 180.3 g. of isopropyl alcohol (3 moles), and 600 ml. of benzene. Upon treatment described in Example X, isolation as described therein yielded 220 g. of

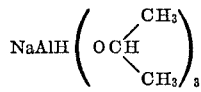

i.e., 96.4% of the theoretical yield.

EXAMPLE XIV

Into the pressure vessel referred to in Example VII, 23 g. sodium (1 mole), 30.6 g. aluminum powder of 88.23% purity (1 mole), 152 g. $CH_3OCH_2CH_2OH$ were charged. Eight steel balls were inserted thereinto and hydrogen introduced to establish a pressure of 75 atm. The reaction was carried out at a temperature of 165° C. for a period of 4 hours. The reaction mixture was extracted from the pressure vessel with 700 ml. benzene and the solid residue was filtered off; upon stripping off the benzene, 195 g. of $NaAlH_2(OCH_2CH_2OCH_3)_2$ was obtained, i.e., 96.5% of the theoretical yield.

EXAMPLE XV

The same pressure vessel as referred to in Example VII was charged with 11.5 g. sodium (0.5 mole), 15.3 g. powdered aluminum of 88.23% purity (0.5 mole), 79.5 g. (0.25 mole) of $NaAlH(OCH_2CH_2OC_2H_5)_3$ and 600 ml. diglyme; a stirring bar was inserted into the pressure vessel and hydrogen introduced to establish a pressure of 85 atm.; the vessel was heated to 165° C. for a period of 3 hours. The solid residue was filtered off and diglyme was stripped off in vacuo to recover the resulting $NaAlH_3OCH_2CH_2OC_2H_5$ The product was obtained in an amount of 104.7 g., i.e., 98.3% of the theoretical yield.

EXAMPLE XVI

Into the pressure vessel referred to in Example VII, were charged 11.5 g. sodium (0.5 mole), 15.3 g. powdered aluminum of 88.23% purity (0.5 mole), 87 g.

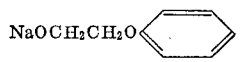

(0.5 mole), 240 g.

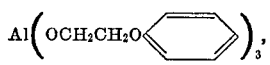

i.e. 0.5 mole, 600 ml. toluene and a stirring rod. Hydrogen was fed into the pressure vessel to establish the pressure of 75 atm.; the reaction was carried out at 160° C. for a period of 4 hours. Upon extraction with toluene, 335 g. of

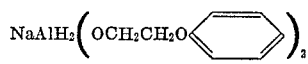

was obtained, i.e., 94.6% of the theoretical yield.

EXAMPLE XVII

Into the pressure vessel referred to in Example VII, there were charged 23 g. sodium (1 mole), 30.6 g. powdered aluminum of 88.23% purity (1 mole), 312.4 g. $CH_3O(CH_2)_4OH$, i.e. 3 moles, and 600 ml. benzene. The reaction and isolation of the product was carried out in the manner described in Example X; 340 g. of $NaAlH(O(CH_2)_4OCH_3)_3$ was obtained, i.e. 95.5% of the theoretical yield.

EXAMPLE XVIII

Into the same pressure vessel as referred to in Example VII there were charged 15.3 g. powdered aluminum (88.23% purity), i.e. 0.5 mole, 71 g.

$NaOCH_2CH_2OCH_2CH_2OCH_3$ (0.5 mole), 131.5 g. $NaAl(OCH_2CH_2OCH_2CH_2OCH_3)_4$, i.e., 0.25 mole, 600 ml. benzene and a stirring rod. Hydrogen was fed into the pressure vessel to establish a pressure of 90 atm. The reaction was carried out at 160° C. for a period of 4 hours. Subsequently, benzene was stripped off; upon extraction with tetrahydrofurane, 210 g. of $NaAlH_2(OCH_2CH_2OCH_2CH_2OCH_3)_2$ was isolated, i.e., the yield amounted to 96.5% of the theoretical.

EXAMPLE XIX

Into a pressure vessel referred to in Example VII were charged 23 g. sodium (1 mole), 30.6 g. powdered aluminum of 88.23% purity (1 mole), 360 g. of monomethylether of diethyleneglycol (3 moles) and 8 steel balls. Hydrogen was introduced into the vessel to establish a pressure of 90 atm. The reaction was carried out at 180° C. for a period of 4.5 hours. Subsequent to extraction with 1000 ml. of tetrahydrofurane, the solid residue was filtered off and 394 g. $NaAlH(OCH_2CH_2OCH_2CH_2OCH_3)_3$ was recovered from the filtrate by stripping off the solvent. The yield was 96.5% of the theoretical.

EXAMPLE XX

Into a pressure vessel as referred to in Example VII, 30.6 g. powdered aluminum of 88.23% purity was charged (one mole); 186 g. of $NaO(CH_2CH_2O)_3CH_3$ and 164 g. of $HO(CH_2CH_2O)_3CH_3$ was added (1 mole of each compound) in 600 ml. benzene. A stirring rod was inserted into the pressure vessel and hydrogen was introduced to establish a pressure of 75 atm. The reaction was carried out at 155° C. for a period of 4 hours; 370 g. of $NaAlH_2(O(CH_2CH_2O)_3CH_3)_2$, which corresponds to 97.8% of the theoretical yield, was recovered from the product.

EXAMPLE XXI

The pressure vessel referred to in Example VII was charged with 17.25 g. sodium (0.75 mole), 7.65 g. powdered aluminum of 88.23% purity (0.25 mole), 231 g.

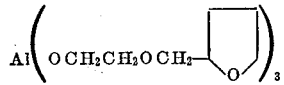

600 ml. benzene and a stirring rod. Hydrogen was introduced into the vessel to establish a pressure of 75 atm. and the reaction was carried out at 150° C. for a period of 2.5 hours. The solid residue was filtered off and upon stripping off benzene from the filtrate, 250 g.

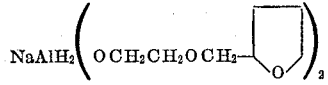

was recovered, i.e., 97.5% of the theoretical yield.

EXAMPLE XXII

Into the pressure vessel referred to in Example VII were charged 46 g. sodium (2 moles), 30.6 g. powdered aluminum (1 mole), 76 g. monomethylether of ethylene glycol (one mole) and 8 steel balls (diameter 2.5 cm.). A pressure of 100 atm. hydrogen was established in the pressure vessel by introduction of hydrogen. The pressure vessel was heated to 160° C. for 3.5 hours. The reaction mixture was extracted with benzene and, subsequently, benzene was stripped off; 98.5 g.

$NaAlH_2(OCH_2CH_2OCH_3)_2$ was recovered, i.e., 97.5% of the theoretical yield. From the solid residue, which remained after the extraction and amounted to 58.2 g., 86.1% was $Na_3AlH_6$, thus, trisodium aluminum hexahydride was obtained in a 98% yield.

EXAMPLE XXIII

The pressure vessel, referred to in Example VII, was charged with 69 g. sodium (3 moles), 30.6 g. powdered aluminum of 88.23% purity (1 mole), 294.1 g.

i.e., 1 mole, 118 g. $AlH_2(OCH_2CH_2OC_2H_5)$ (0.1 mole) and 8 steel balls. Hydrogen was fed into the vessel to establish a pressure of 100 atm. and the reaction mixture was heated to 160° C. for a period of 3.5 hours. Extraction with benzene yielded 448 g. of the product $NaAlH_2(OCH_2CH_2OC_2H_5)_2$, which corresponds to 97.4% of the theoretical yield. The subsequent extraction with benzene gave $NaAlH_4$ in a 96.3% yield; 52 g. of the said by-product was recovered.

EXAMPLE XXIV

The same pressure vessel as referred to in Example VII was charged with 30.6 g. powdered aluminum of 88.23% purity (1 mole), 128 g. $NaOCH_2CH_2SC_2H_5$ (1 mole), 212.2 g. $C_2H_5SCH_2CH_2OH$ (2 moles), and 600 ml. benzene. The reaction and isolation was carried out in the manner described in Example X. Isolation yielded 350 g. $NaAlH(OCH_2CH_2SC_2H_5)_3$, i.e., 95.6% of the theoretical yield.

EXAMPLE XXV

The pressure vessel referred to in Example VII was charged with 2.3 g. sodium (0.1 mole), 3.1 g. aluminum powder of 88.23% purity (0.1 mole), 179.3 g.

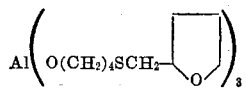

i.e., 0.3 mole, 64 g.

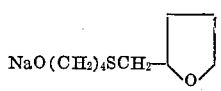

i.e., 0.3 mole, 600 ml. benzene and a stirring rod. Hydrogen was introduced to establish a pressure of 100 atm., and reaction carried out at 170° C. for a period of 4 hours. Identical isolation as described in Example X yielded 200 g.

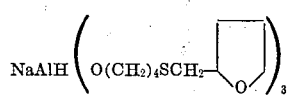

i.e., 96% of the theoretical yield.

EXAMPLE XXVI

The pressure vessel referred to in Example VII was charged with 23 g. sodium (1 mole), 30.6 g. aluminum powder of 88.23% purity (1 mole), 284.2 g.

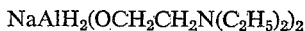

$NaAlH_2(OCH_2CH_2N(C_2H_5)_2)_2$ (1 mole), 600 ml. diglyme and a stirring rod. Hydrogen was introduced to establish a pressure of 100 atm. and the reaction mixture was heated to 160° C. for a period of 4 hours. The solid residue was filtered off and, by stripping off diglyme in vacuo, 330 g. of

$NaAlH(OCH_2CH_2N(C_2H_5)_2)_3$ was recovered, which corresponds to 97.5% of the theoretical yield.

EXAMPLE XXVII

Into the pressure vessel referred to in Example VII, 23 g. sodium (1 mole), 30.6 g. powdered aluminum of 88.23% purity (1 mole), 210.36 g. $(CH_3)_2NCH_2CH_2SH$ (2 moles) and 600 ml. benzene was charged. Identical operation and isolation as described in Example X yielded 255 g. $NaAlH_2(SCH_2CH_2N(CH_3)_2)_2$, which corresponds to 97.9% of the theory.

EXAMPLE XXVIII

The pressure vessel referred to in Example VII was charged with 46 g. sodium (2 moles), 30.6 g. aluminum powder of 88.23% purity (1 mole), 78.85 g. of

$NaAlH(OCH_2CH_2N(CH_3)_2)_3$, i.e. 0.25 mole, and 8 steel balls. Hydrogen was introduced into the vessel to establish a pressure of 85 atm. The reaction was carried out at 160° C. for a period of 2.5 hours. Extraction with tetrahydrofurane yielded 103 grams of $NaAlH_3(OCH_2CH_2N(CH_3)_2)$, i.e., 97.4% of the theoretical yield; moreover, 57.4 g. of an insoluble substance was obtained, which contained 86.5% of $Na_3AlH_6$ in a yield which corresponded to 97.2% of the theoretical.

EXAMPLE XXIX

The same pressure vessel referred to in Example VII was charged with 18 g. sodium hydride (0.75 mole), 7.65 g. of aluminum powder of 88.23% purity (0.25 mole), 150.1 g. $Al(SCH_2CH_2OCH_3)_3$, i.e., 0.5 mole, 600 ml. toluene and a stirring rod. The pressure was increased to 100 atm. by introducing hydrogen and the reaction carried out at 170° C. for a period of 5 hours. Isolation was carried out in a manner analogous to that of Example X; 170 grams of $NaAlH_2(SCH_2CH_2OCH_3)_2$ was recovered, i.e., 96.8% of the theoretical yield.

EXAMPLE XXX

The pressure vessel referred to in Example VII was charged with 11.5 g. sodium (0.5 mole), 15.3 g. aluminum powder of 88.23% purity (0.5 mole), 137.3 g.

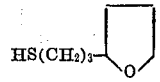

(1 mole), 600 ml. toluene and a stirring rod. Reaction and isolation was carried out in the same manner as described in Example X. 155.5 g. of

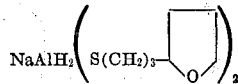

was recovered, i.e., 95.6%.

EXAMPLE XXXI

The pressure vessel referred to in Example VII was charged with 11.5 g. sodium (0.5 mole), 7.65 g. aluminum powder of 88.23% purity (0.25 mole), 87.15 g.

$Al(SCH_2CH_2SCH_3)_3$ (0.25 mole), 600 ml. of toluene and a stirring rod. The reaction and isolation was carried out in the manner as described in Example XXIX. The yield was 195 g.

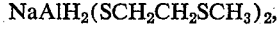

$NaAlH_2(SCH_2CH_2SCH_3)_2$, i.e., 97.7% of the theoretical.

EXAMPLE XXXII

The same pressure vessel as referred to in Example VII was charged with 46 g. sodium (2 moles), 30.6 g. aluminum powder of 88.23% purity (1 mole), 89 g.

$(CH_3)_2NCH_2CH_2OH$ (1 mole) and 8 steel balls. Hydrogen was introduced into the vessel to increase the pressure to 90 atm. The reaction was carried out at 160° C. for a period of 4 hours. Extraction with benzene yielded a solution from which, subsequent to stripping off of benzene, 110 g. of $$NaAlH_2(OCH_2CH_2N(CH_3)_2)$$

was recovered, i.e. 96.5% of the theoretical yield. Besides, 58.6 g. of solid residue was obtained, containing $Na_3AlH_6$ in a yield which corresponds to 96% of the theoretical. The solid residue contained 83.6% of $Na_3AlH_6$.

EXAMPLE XXXIII

The same pressure vessel referred to in Example VII was charged with 15.3 g. aluminum powder (0.5 mole), 69.5 g. $NaOCH_2$ (0.5 mole), 117.07 g.

$$HOCH_2-\!\!\left\langle\!\!\bigcirc\!\!\right\rangle$$

(1 mole), 600 ml. benzene and a stirring rod. Further treatment of the reaction mixture and isolation was the same as in Example X; 196 g. of $$NaAlH\!\left(OCH_2-\!\!\left\langle\!\!\bigcirc\!\!\right\rangle\right)_3$$

was obtained, which corresponds to 98.2% of the theoretical yield.

EXAMPLE XXXIV

The same pressure vessel referred to in Example VII was charged with 11.5 g. sodium (0.5 mole), 15.3 g. aluminum powder of 88.23% purity (0.5 mole), 253.6 g.

$$Al\!\left(OCH_2CH_2OCH_2-\!\!\left\langle\!\!\bigcirc\!\!\right\rangle\right)_3$$

i.e., 0.5 mole, 91.5 g.

$$NaOCH_2CH_2OCH_2-\!\!\left\langle\!\!\bigcirc\!\!\right\rangle$$

(0.5 mole), 600 ml. toluene and a stirring rod. Further treatment of the reaction mixture and isolation was the same as in Example XXIX. The reaction yielded 365.3 g.

$$NaAlH_2\!\left(OCH_2CH_2OCH_2-\!\!\left\langle\!\!\bigcirc\!\!\right\rangle\right)_2$$

i.e., 98.2% of the theoretical.

EXAMPLE XXXV

Into the same pressure vessel as described and referred to in Example VII were charged 11.5 g. sodium (0.5 mole), 15.3 g. aluminum powder of 88.23% purity (0.5 mole). 167.1 g. $HOCH_2CH_2N(CH_2CH_2OCH_3)_2$ (1 mole), 600 ml. benzene and a stirring rod. The reaction and isolation was carried out in the manner described in Example X; 188 g. of $NaAlH_2(OCH_2CH_2N(CH_2CH_2OCH_3)_2)_2$ was obtained, i.e., 97.8% of the theoretical yield.

EXAMPLE XXXVI

The same pressure vessel referred to in Examples I and VII was charged with 23 g. sodium (1 mole), 15.3 g. aluminum powder of 88.23% purity (0.5 mole), 116.1 g.

$$AlH\!\left[OCH_2CH_2N\!\!\begin{array}{c}CH_3\\ \diagdown\\ CH_2\\ |\\ CH_3\end{array}\right]$$

i.e. 0.5 mole, 600 ml. toluene and a stirring rod. Further treatment of the reaction mixture and isolation of the product were the same as in Example XXIX; 150 g. of $$NaAlH_3\!\left(OCH_2CH_2N\!\!\begin{array}{c}CH_3\\ \diagdown\\ CH_2CH_3\end{array}\right)$$

was obtained, i.e., 96.7% of the theoretical yield.

EXAMPLE XXXVII

The same pressure vessel referred to in Example VII was charged with 49 g. $NaOCH_2CH_2OCH_3$ (0.5 mole), 70 g. $NaAl(OCH_2CH_2OCH_3)_4$, i.e., 0.2 mole, 15.8 g. $AlH(OCH_2CH_2OCH_3)_2$ (0.1 mole), 4.6 g. sodium (0.2 mole) 18.36 g. aluminum powder of 88.23% purity (0.6 mole), 25.2 g. $Al(OCH_2CH_2OCH_3)_3$, i.e., 0.1 mole, 55.2 g. $NaAlH(OCH_2CH_2OCH_3)_3$, i.e., 0.2 mole, 600 ml. toluene and a stirring bath. The presure vessel was fed with hydrogen to establish a pressure of 100 atm. and a stirring rod. The reaction was carried out for a period of 4 hours at 165° C. The solid residue was filtered off and toluene stripped off from the filtrate; 238 g.

$$NaAlH_2(OCH_2CH_2OCH_3)_2$$

was obtained, i.e. 98.1% of the theoretical yield.

EXAMPLE XXXVIII

The same pressure vessel referred to in Example VII was charged with 6 g. sodium hydride (0.25 mole), 7.65 g. aluminum powder of 88.23% purity (0.25 mole), 99.7 g. $NaAl(OCH_2CH_2CH(CH_3)_2)_4$, i.e., 0.25 mole, 600 ml. benzene and a stirring rod. Further treatment of the reaction mixture and isolation of the product were the same as in Example XXIX. The reaction yielded 100 g.

$$NaAlH_2((CH_3)_2CHCH_2CH_2O)_2$$

i.e., 97.2% of the theoretical.

EXAMPLE XXXIX

The pressure vessel referred to in Example VII was charged with 24 g. sodium hydride (1 mole), 30.6 g. aluminum powder of 88.23% purity (1 mole), 600 ml. diglyme and a stirring rod. The pressure vessel was closed and 74.12 g. isobutyl alcohol injected thereinto. Hydrogen was introduced to establish a pressure of 100 atm. hydrogen; the reaction was carried out at 170° C. for a period of 5 hours. Subsequent to filtering off the solid residue, diglyme was vacuum-stripped off. The isolation yielded 122 g.

$$NaAlH_3\!\left(OCH\!\!\begin{array}{c}CH_3\\ \diagdown\\ CH_3\end{array}\right)$$

i.e., 96.8% of the theoretical yield.

EXAMPLE XL

The pressure vessel referred to in Example VII was charged with 46 g. sodium (2 moles), 15.3 g. aluminum powder of 88.23% purity (0.5 mole), 73 g.

$$(n\text{-}C_4H_9OC_2H_4)AlH_2$$

(0.5 mole) and 8 steel balls. The pressure vessel was closed and hydrogen introduced thereinto to establish a pressure of 100 atm. The reaction was carried out at 155° C. for a period of 5 hours. Extraction with tetrahydrofurane yielded 83 g. $NaAlH_3OCH_2CH_2OC_4H_9\text{-}n$ i.e., 97.6% of the theoretical yield; the solid residue amounted to 54.8 g. of a solid substance, 89.4% of which was $$Na_3AlH_6,$$

i.e., 96% of the theoretical amount.

EXAMPLE XLI

Into the pressure vessel referred to in Example VII, was charged with 6 g. sodium hydride (0.25 mole), 7.65 g. aluminum powder of 88.23% purity (0.25 mole), 133.7 g.

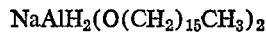
NaAlH$_2$(O(CH$_2$)$_{15}$CH$_3$)$_2$ i.e. 0.25 mole, 600 ml. benzene and a stirring rod. Further treatment and isolation were the same as in Example XXIX. The reaction yielded 145 g. of NaAlH$_3$(O(CH$_2$)$_{15}$CH$_3$)

i.e., 98.5% of the theoretical.

EXAMPLE XLII

Into the pressure vessel referred to in Example VII were charged 42.0 g. sodium hydride (1.75 moles), 7.65 g. aluminum powder of 88.23% purity (0.25 mole), 112 g.

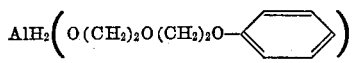
AlH$_2$(O(CH$_2$)$_2$O(CH$_2$)$_2$O—⟨⟩)

i.e. 0.5 mole, and 8 steel balls. Further treatment of the reaction mixture and isolation were carried out in the manner described in Example XL. The reaction yielded 108 g.

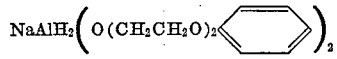
NaAlH$_2$(O(CH$_2$CH$_2$O)$_2$⟨⟩)$_2$ i.e., 97.7% of the theoretical, and 54 g. of a solid product, insoluble, containing 92.1% of Na$_3$AlH$_6$, i.e., 97.6% of the theoretical yield of the latter compound.

EXAMPLE XLIII

Into the pressure vessel referred to in Example VII were charged 72.1 g.

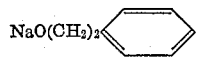
NaO(CH$_2$)$_2$⟨⟩

(0.5 mole), 15.3 g. aluminum powder of 88.23% purity (0.5 mole), 61.7 g.

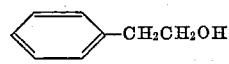
⟨⟩—CH$_2$CH$_2$OH (0.5 mole), 600 ml. benzene and a stirring rod. The reaction was carried out and the product was isolated in the manner described in Example X; 190 g. of

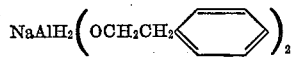
NaAlH$_2$(OCH$_2$CH$_2$⟨⟩)$_2$ was obtained, i.e., 96.4% of the theoretical yield.

EXAMPLE XLIV

Into the pressure vessel referred to in Example VII were charged 11.5 g. sodium (0.5 mole), 15.3 g. aluminum powder of 88.23% purity (0.5 mole), 162 g. benzyl alcohol (1.5 moles), 600 ml. benzene and a stirring rod. Further treatment of the reaction mixture and subsequent isolation were carried out in the manner described in Example X. The yield was 180 g.

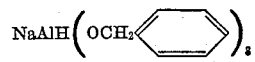
NaAlH(OCH$_2$⟨⟩)$_3$ i.e., 96.7% of the theoretical.

EXAMPLE XLV

The same pressure vessel referred to in Example VII was charged with 11.5 g. sodium (0.5 mole), 15.3 g. aluminum powder of 88.23% purity (0.5 mole), 183.24 g. o-xylenol (1.5 moles), 600 ml. toluene and a stirring rod. Further treatment of the product and procedure of isolation were similar to those described in Example X. The reaction yielded 200 g.

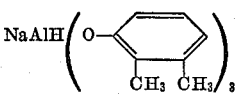
NaAlH(O—⟨⟩(CH$_3$ CH$_3$))$_3$ i.e., 96.5% of the theoretical.

EXAMPLE XLVI

Into the same pressure vessel as described and referred to in Example VII were charged 5.75 g. sodium (0.25 mole), 7.65 g. aluminum powder of 88.23% purity (0.25 mole), 95.12 g. n-C$_4$H$_9$(OCH$_2$CH$_2$CH$_2$)$_2$OH, i.e. 0.5 mole, 600 ml. benzene and a stirring rod. Treatment of the reaction mixture and isolation of the product were the same as in Example X. The reaction and isolation yielded 105 g. of NaAlH$_2$(O(CH$_2$CH$_2$CH$_2$O)$_2$C$_4$H$_9$)$_2$ i.e. 97.5% of the theoretical.

The starting compound n-C$_4$H$_9$(OCH$_2$CH$_2$CH$_2$)$_2$OH was obtained in the following manner: Into a 2-liter three-necked flask provided with a stirrer, a dropping funnel and a reflux condenser were charged 1200 ml. toluene and 154 g. of n-C$_4$H$_9$(CH$_2$)$_3$ONa. The reaction mixture was heated to 90° C. and 95 g. of trimethyleneglycol chlorohydrin was added dropwise for a period of 1.5 hours. Subsequently, the reaction mixture was heated for another 4 hours. Upon cooling, the solid residue was filtered off and the filtrate was fractionally distilled. The distillation fraction 126–130° C./13 mm. Hg. yielded 85 g. of the desired substance.

EXAMPLE XLVII

The same pressure vessel referred to in Example VII was charged with 12.0 g. sodium hydride (0.5 mole), 7.65 g. aluminum powder of 88.23% purity (0.25 mole), 64.5 g.

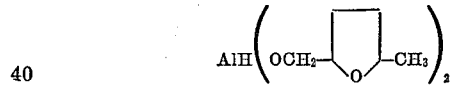
AlH(OCH$_2$—⟨O⟩—CH$_3$)$_2$ 600 ml. diglyme and a stirring rod. Further treatment of the reaction mixture was the same as in Example XXIX. The solid residue was filtered off from the reaction mixture and diglyme was vacuum-stripped; 40 g. of the product of the formula

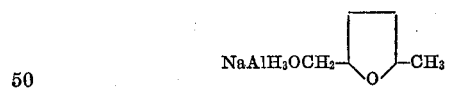
NaAlH$_3$OCH$_2$—⟨O⟩—CH$_3$ was obtained, i.e., the yield amounted to 95.23% of the theoretical.

EXAMPLE XLVIII

Into a 2.5-liter pressure vessel were charged 46 g. sodium (2 moles), 32.9 g. aluminum of 82% purity in powdered form (aluminum contained 18% of aluminum oxide as impurity) and 38 g. CH$_3$OC$_2$H$_4$OH (0.5 mole), 500 ml. benzene and a stirring bar for stirring of the reaction mixture. Hydrogen was fed into the pressure vessel to establish a pressure of 100 atm., and the reaction was carried out at 200° C. for a period of 3 hours. The reaction mixture was filtered off and extracted with tetrahydrofurane; 55.4 g. of Na$_3$AlH$_6$ was obtained of 88.5% purity, i.e., 96.1% of the theoretical yield. The benzene filtrate contained alkoxyaluminohydrides, which were subsequently used for catalyzing the next synthesis.

EXAMPLE XLIX

The same pressure vessel as described in Example VII was charged with 46 g. sodium (2 moles), 61.2 g. powdered aluminum of 88.23% purity (2 moles), 32 g. of methyl alcohol (1 mole) and 600 ml. benzene. A stirring bar was inserted for stirring of the reaction mixture. Hydrogen was introduced to build up a pressure of 100 atm.

The reaction was carried out at 170° C. for a period of 3.5 hours. Benzene was filtered off and 124.5 g. of a mixture of NaAlH₃OCH₃ and NaAlH₄ was extracted with tetrahydrofurane from the crude product which corresponds to 95.04% of the theoretical yield.

EXAMPLE L

The same pressure vessel as described in Example VII was charged with 92 g. sodium (4 moles), 54 g. Al(OC₂H₅)₃, i.e. 0.33 mole, 51 g. powdered aluminum of 88.23% purity (1.66 moles), 46 g. ethyl alcohol (1 mole) and 600 ml. toluene. The reaction and isolation of the product were carried out in a similar manner as described in Example XLIX. With tetrahydrofurane, 138.2 g. of NaAlH₂(OC₂H₅)₂ was extracted from the reaction mixture, i.e., 97.32% of the theoretical yield. The solid extraction residue amounted to 109.5 g. containing 89.51% of Na₃AlH₆, i.e., 96.1% of the theoretical yield.

EXAMPLE LI

The same pressure vessel as described in Example VII was charged with 34.5 g. sodium (1.5 moles), 45.9 g. powdered aluminum (88.23%), i.e., 1.5 moles, 45.5 g. NaAl(OC₆H₁₃-n)₄, i.e. (0.1 mole), 90.5 g.

i.e. 0.4 mole, 600 ml. diglyme and a stirring bar. The vessel was fed with hydrogen to build up a pressure of 100 atm. and, then, heated to 160° C. for a period of 4.5 hours. Subsequent to filtering off the said residue, the diglyme was stripped off in vacuo; 204.5 g. of a mixture was obtained, containing NaAlH₃(O(CH₂)₁₅CH₃-n), NaAlH₃(O(CH₂)₅CH₃-n), and NaAlH₄, which corresponds to 94.6% of the theoretical yield.

EXAMPLE LII

The pressure vessel as described in Example VII was charged with 92 g. sodium (2 moles), 21.42 g. of powdered aluminum (88.23% purity), i.e., 0.7 mole, 31.25 g. NaAlH(OCH₂CH₂CH(CH₃)₂)₃, i.e., 0.1 mole, 24.6 g. aluminum isobutylate (0.1 mole), 600 ml. benzene and a stirring bar. Hydrogen was introduced into the vessel to establish a pressure of 100 atm. and the vessel was heated for 5 hours to 170° C. Subsequently to stripping off of benzene, 60 g. of a mixture was extracted with tetrahydrofurane, consisting of NaAlH₂(OCH₂CH₂CH(CH₃)₂)₂ and NaAlH₂(OCH₂CH(CH₃)₂)₂, which corresponds to 94.1% of the theoretical yield. The solid extraction residue amounted to 67.3 g. and contained 88.4% of Na₃AlH₆, i.e. 97.2% of the theoretical yield.

EXAMPLE LIII

The pressure vessel as described in Example VII was charged with 80 g. sodium (3.5 moles), 45.9 g. powdered aluminum of 88.23% purity (1.5 moles), 600 ml. toluene, 37 g. n-butyl alcohol, 37 g. tertiary butyl alcohol and a stirring bar. The reaction and isolation was carried out in a manner similar to that described in Example LII. The extraction with tetrahydrofurane yielded 97 g. of NaAlH₂(OCH₂CH₂CH₂CH₃)(OC(CH₃)₃), which corresponds to 97.8% of the theoretical yield. The insoluble substance which amounted to 108 g. had a 91.6% content of Na₃AlH₆; followingly 97% of the theoretical yield of Na₃AlH₆ was achieved.

EXAMPLE LIV

The same pressure vessel as described in Example VII was charged with 46 g. sodium (2 moles), 61.2 g. of aluminum powder of 88.23% purity (2 moles), 600 ml. benzene, 94.1 g. phenol (1 mole), and a stirring bar. A pressure of 100 atm. was built up in the vessel by introducing hydrogen and the vessel was heated to 170° C. for a period of 5 hours. Subsequent to evaporation of benzene, extraction of the distillation residue with tetrahydrofurane was carried out to yield 190 g. of the product mixture of NaAlH₄ and

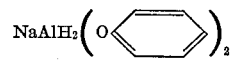

i.e. the yield was 95% of the theoretical.

EXAMPLE LV

The same pressure vessel as described in Example VII, was charged with 80.5 g. sodium (3.5 moles), 45.9 g. powdered aluminum of 88.23% purity (1.5 moles), 54 g. p-cresol (0.5 mole), 61.1 g. o-xylenol (0.5 mole), 600 ml. toluene and a stirring bar. The reaction and isolation were carried out in a manner similar to that of Example LII; 132 g. was obtained of a mixture containing

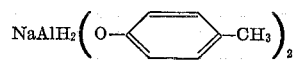

and

i.e., 94.2% of the theory and 115 g. of a solid insoluble residue, in which the content of Na₃AlH₆ amounted to 85.6%, i.e., to 96% of the theoretical yield.

EXAMPLE LVI

The same pressure vessel as described in Example VII was charged with 80.5 g. sodium (3.5 moles), 45.9 g. aluminum powder of 88.23% purity (1.5 moles) and 133.13 g.

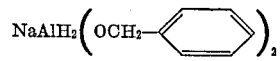

i.e. 0.5 mole, 600 ml. benzene and a stirring bar. The reaction and isolation were carried out in the manner described in Example LII; 156 g. of

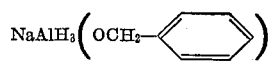

was obtained, which corresponds to 97.5% of the theory. The insoluble residue amounted to 110 g., the content of Na₃AlH₆ was 89.5%, i.e., 96% of the theory.

EXAMPLE LVII

The same pressure vessel as described in Example VII was charged with 80.5 g. sodium (3.5 moles), 45.9 g. aluminum powder of 88.23% purity (1.5 moles), 600 ml. benzene, 122 g. of 2-phenyl-ethanol (1 mole), and a stirring bar. The reaction and isolation were carried out in a manner similar to that of Example LII; 142 g. of

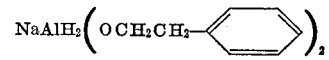

was obtained, i.e., 96.5% of the theory, and 112 g. of a solid insoluble residue, in which the content of Na₃AlH₆ amounted to 87.9%, i.e. to 96% of the theoretical.

EXAMPLE LVIII

The same pressure vessel as described in Example VII was charged with 59.8 g. sodium (2.6 moles), 24.8 g. sodium tetrahydrofurfurylate (0.2 mole), 36.72 g. aluminum powder of 88.23% purity (1.2 moles), 600 ml. toluene, 20.4 g. tetrahydrofurfuryl alcohol (0.2 mole), 23.2 g.

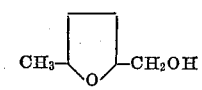

and a stirring bar. The pressure of hydrogen in the pressure vessel was build up to 100 atm., and the vessel was heated to 165° C. for a period of 4.5 hours. Subsequent to filtration of the reaction mixture, toluene was stripped off from the reaction mixture and 102 g. of

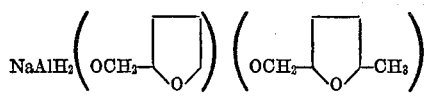

recovered, which corresponds to 95.3% of the theoretical. The filtration cake yielded 90 g. of a solid substance, which contained 87.8% of $Na_3AlH_6$, i.e., 96.8% of the theoretical yield.

EXAMPLE LIX

The same pressure vessel as described in Example VII was charged with 46 g. sodium (2 moles), 76.5 g. of aluminum powder of 88.23% purity (2.5 moles), 69 g.

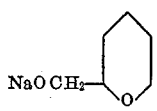

600 ml. benzene, a stirring bar and 58 g.

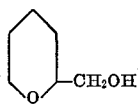

The pressure vessel was fed with hydrogen to build up a pressure of 100 atm., and heated to 170° C. for a period of 4.5 hours. From the reaction mixture, 137 g. of

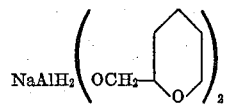

was extracted with benzene, i.e., 97% of the theory; subsequently, 103 g. of $NaAlH_4$ was recovered with tetrahydrofurane from the extraction residue, which corresponds to 95.3% of the theory.

EXAMPLE LX

The same pressure vessel as described in Example VII was charged with 11.5 g. sodium (0.5 mole), 98 g. $CH_3OCH_2CH_2ONa$ (1 mole), 45.9 g. aluminum powder of 88.23% purity (1.5 moles), 600 ml. benzene and a stirring bar. The reaction and isolation were carried out in a manner identical to that of Example LIX; 99 g. of $NaAlH_2(OCH_2CH_2OCH_3)_2$ and 52 g. of $NaAlH_4$ were obtained, i.e., 98% and 96.3% of the theory, respectively.

EXAMPLE LXI

The same pressure vessel as described in Example VII was charged with 36 g. sodium hydride (1.5 moles), 45.9 g. aluminum powder of 88.23% purity (1.5 moles), 85.2 g. $NaAlH_3OCH_2CH_2OC_2H_5$ (0.6 mole), 600 ml. toluene and a stirring bar. The reaction and the isolation were carried out in a manner similar to that of Example LIX; 58.5 grams of $NaAlH_2(OCH_2CH_2OC_2H_5)_2$ and 95 g. $NaAlH_4$ were obtained, i.e., the yields amounted to 96.5% and 97.7%, respectively.

EXAMPLE LXII

The same pressure vessel as described in Example VII was charged with 160 g.

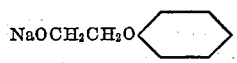

(1 mole), 12 g. sodium hydride (0.5 mole), 11.5 g. sodium (0.5 mole), 15.3 g. aluminum powder of 88.23% purity (0.5 mole), 600 ml. benzene and a stirring bar.

The reaction and the isolation were carried out in a manner similar to that described in Example LVIII; 158 g. of

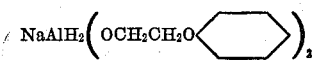

was obtained, i.e. 96.9% of the theory, plus 57 g. of a solid insoluble substance containing 85.9% of $Na_3AlH_6$, which corresponds to 96% of the theory.

EXAMPLE LXIII

The same pressure vessel as described in Example VII was charged with 32.2 g. sodium (1.4 moles), 30.6 g. aluminum powder of 88.23% purity (1 mole), 47.2 grams of $AlH_2(OCH_2CH_2CH_2OCH_3)$, i.e., 0.4 mole, 600 ml. benzene and a stirring bar. The reaction and the isolation were carried out in the manner described in Example LIX; 44.5 g. of $NaAlH_2(OCH_2CH_2CH_2OCH_3)_2$ and 62.5 g. $NaAlH_4$ were obtained, i.e. 96.7% and 96.4%, respectively, of the theoretical yield.

EXAMPLE LXIV

The same pressure vessel as described in Example VII was charged with 25.3 g. sodium (1.1 moles), 36.6 g. aluminum powder of 88.23% purity (1 mole), 26.6 grams of $AlH(OCH_2CH_2OCH_2CH_2OCH_3)_2$ (0.1 mole), 600 ml. toluene and a stirring bar. The reaction and the isolation were carried out in the manner described in Example LIX; 28 grams of $NaAlH_2(OCH_2CH_2OCH_2CH_2OCH_3)_2$ and 52.5 g. $NaAlH_4$ were obtained, i.e. 96.5% and 97.2%, respectively, of the theoretical yield.

EXAMPLE LXV

The same pressure vessel as described in Example VII was charged with 44.6 g. sodium (1.94 moles), 20.2 g. aluminum powder of 88.23% purity (0.66 mole), 14 grams of $NaAl(O(CH_2CH_2O)_3CH_3)_4$ (0.2 mole), 600 ml. benzene and a stirring bar. The reaction and isolation were carried out in a manner identical with that of Example LVIII. The reaction time, however, was prolonged to 5.5 hours; 14.5 g. of $NaAlH_2(O(CH_2CH_2O)_3CH_3)_2$ was obtained (95.9% theory), plus 68 g. of solid insoluble substance, containing 93.4% of $Na_3AlH_6$ i.e., 97.2% of the theoretical yield.

EXAMPLE LXVI

The same pressure vessel as described in Example VII was charged with 25.3 g. sodium (1.1 moles), 33.7 g. aluminum powder of 88.23% purity (1.1 moles), 600 ml. toluene and 29.2 g.

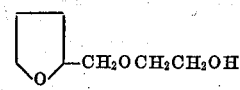

(0.2 mole), and a stirring bar. The reaction and isolation were carried out in a manner identical with that of Example LIX; 33 grams of

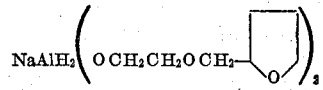

and 52 g. of $NaAlH_4$ were obtained, i.e. 96.5% and 96.3% of the theory, respectively.

EXAMPLE LXVII

The same pressure vessel as described in Example VII was charged with 52.5 g. sodium (2.2 moles), 23.25 g. of aluminum powder of 88.23% purity (0.75 mole), 47.52 g.

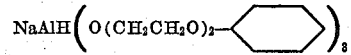

i.e. 0.08 mole, 600 ml. toluene, and a stirring bar. The reaction and the isolation were carried out in the manner described in Example LVIII; 47.5 g. of

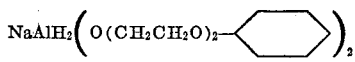

was obtained, i.e., 95.6% of the theory, plus 78 g. of insoluble solid substance, containing 91.6% Na$_3$AlH$_6$, i.e. 97.3% of the theoretical yield.

EXAMPLE LXVIII

The same pressure vessel as described in Example VII was charged with 28.75 g. sodium (1.25 moles), 38.25 g. aluminum powder of 88.23% purity (1.25 moles), 600 ml. benzene 95.1 g. n-C$_4$H$_9$(OCH$_2$CH$_2$CH$_2$)$_2$OH (0.5 mole) and a stirring bar. The reaction and isolation were carried out in the manner described in Example LIX; 105 g. NaAlH$_2$(O(CH$_2$CH$_2$CH$_2$O)$_2$C$_4$H$_9$-n)$_2$ and 52 g. NaAlH$_4$ were obtained, i.e., 97.5% and 96.3% of the theoretical yield, respectively.

EXAMPLE LXIX

The same pressure vessel as described in Example VII was charged with 34.5 g. sodium (1.5 moles), 30.6 g. aluminum powder of 88.23% purity (1 mole), 64 g.

(0.5 mole), 600 ml. toluene, 106 g. C$_2$H$_5$SCH$_2$CH$_2$OH (1 mole) and a stirring bar. Hydrogen was introduced to build up a pressure of 100 atm. and the mixture was heated to 170° C. for a period of 6 hours. The reaction mixture was extracted with tetrahydrofurane, subsequent to stripping off toluene, 179 g. NaAlH(OCH$_2$CH$_2$SC$_2$H$_5$)$_3$, i.e., 97.3% of the theory was recovered from the extract. The solid residue amounted to 58 g. and contained 89.5% Na$_3$AlH$_6$, i.e., 96% of the theory.

EXAMPLE LXX

The same pressure vessel as described in Example VII was charged with 69 g. sodium (3 moles), 30.6 g. aluminum powder of 88.23% purity (1 mole), 362.6 grams of

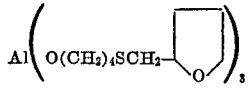

i.e. 0.66 mole, 600 ml. toluene and a stirring bar. The reaction and isolation were identical with those of Example LXIX; 420 g.

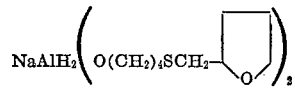

was obtained (97.6% of the theory), plus 81 g. of a solid insoluble substance, containing 82.1% of Na$_3$AlH$_6$; hence, the yield of Na$_3$AlH$_6$ was 97.8% of the theoretical.

EXAMPLE LXXI

The same pressure vessel as in Example VII was charged with 25.3 g. sodium (1.1 moles), 33.66 g. aluminum powder of 88.23% purity (1.1 moles), 40.2 grams of NaAl(OCH$_2$CH$_2$N(CH$_3$)$_2$)$_4$ (0.1 mole), 600 ml. benzene and a stirring bar. The reaction and isolation were carried out in a similar manner as that described in Example LIX; 44 g. NaAlH$_2$(OCH$_2$CH$_2$N(CH$_3$)$_2$)$_2$ and 52 g. NaAlH$_4$ were obtained, i.e. 96.5% and 96.2%, respectively, of the theoretical yields.

EXAMPLE LXXII

The same pressure vessel as described in Example VII was charged with 64.4 g. sodium (2.8 moles), 30.6 g. aluminum powder 88.23% pure (1 mole), 79.8 grams of NaAlH(OCH$_2$CH$_2$N(C$_2$H$_5$)$_2$)$_3$ (0.2 mole), 600 ml. benzene and a stirring bar. The reaction and isolation were carried out in a manner similar to that of Example LVIII; 83 grams of NaAlH$_2$(OCH$_2$CH$_2$N(C$_2$H$_5$)$_2$)$_2$ was obtained, i.e., 97.4% of the theoretical, and 97 g. of a solid insoluble substance, i.e. 91.75% of Na$_3$AlH$_6$, which corresponds to 96.9% of the theoretical yield.

EXAMPLE LXXIII

The same pressure vessel as described in Example VII was charged with 25.3 g. sodium (1.1 moles), 33.7 g. aluminum powder 88.23% pure (1.1 moles), 33.4 grams of (CH$_3$OCH$_2$CH$_2$)$_2$NCH$_2$CH$_2$OH (0.2 mole), 600 ml. toluene and a stirring rod. The reaction and the isolation were carried out as in Example LIX; 37 g.

and 52.5 g. NaAlH$_4$ were obtained, which amounted to 96.3% and 97.2%, respectively, of the theoretical yield.

EXAMPLE LXXIV

The same pressure vesel as described in Example VII was charged with 28.75 g. sodium (1.25 moles), 30 g. aluminum powder 88.23% pure (1 mole), 58 grams of Al(OCH$_2$CH$_2$N(CH$_3$)(C$_2$H$_5$))$_2$, 600 ml. benzene and a stirring bar. The reaction and isolation were carried out as in Example LVIII. There were obtained: 62.5 grams of NaAlH$_2$(OCH$_2$CH$_2$N(CH$_3$)(C$_2$H$_5$))$_2$, i.e. 97.6% of the theory, and 106.5 g. of an insoluble substance, which contained 92.95% of Na$_3$AlH$_6$, i.e., 97% of the theoretical yield.

EXAMPLE LXXV

The same pressure vessel as in Example VII was charged with 85.1 g. sodium (3.7 moles), 39.8 g. aluminum powder 88.23% pure (1.3 moles), and 45.8 grams of NaAl(O(CH$_2$)$_3$(CH$_3$)$_2$)$_4$ (0.1 mole), 600 ml. toluene and a stirring bar. The reaction and isolation were carried out as in Example LVIII. There were obtained: 50 grams of NaAlH$_2$(O(CH$_2$)$_3$N(CH$_3$)$_2$)$_2$, i.e., 97.6% of the theory, and 127 g. of an insoluble substance, which contained 94.2% of Na$_3$AlH$_6$, i.e., 98% of the theoretical yield.

EXAMPLE LXXVI

The same pressure vessel as described in Example VII was charged with 18.2 g.

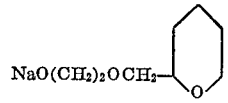

(0.1 mol), 48.3 g. sodium (2.1 moles), 54.3 g. aluminum powder 88.23% pure (2.1 moles), 50.4 g.

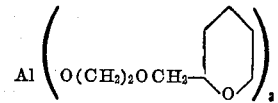

i.e., 0.1 mole, 600 ml. toluene and a stirring bar. The reaction and isolation were carried out as in Example LIX. The yields were: 72.5 g.

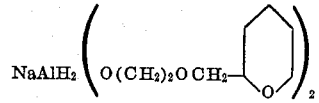

i.e., 97.9% of the theoretical, and 104 g. NaAlH$_4$, which corresponds to 96.3% of the theoretical amount.

EXAMPLE LXXVII

The same pressure vessel as in Example VII was charged with 46 g. sodium (2 moles), 18.4 g. aluminum powder 88.23% pure (0.6 mole), 18.8 g.

i.e., 0.2 mole, and 600 ml. benzene and a stirring bar. The reaction and isolation were carried out as in Example LVIII. Subsequent to stripping off benzene from the reaction mixture, extraction with tetrahydrofurane was carried out, which yielded 32.5 g. NaAlH$_3$(OCH$_2$CH$_2$OC$_4$H$_9$-n), i.e., 96.7% of the theory; the solid extraction residue amounted to 63 g.; 95.2% thereof was $Na_3AlH_6$, which corresponds to 98% of the theory.

EXAMPLE LXXVIII

The same pressure vessel as in Example VII was charged with 190 g.

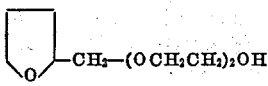

(1 mole), 15.3 g. aluminum powder 88.23% pure (0.5 mole), 11.5 g. sodium (0.5 mole), and 600 ml. benzene. The reaction and isolation were carried out as in Example X. The yield was 207.5 g. of

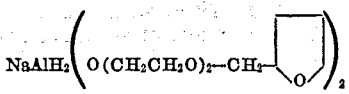

96.5% of the theory.

EXAMPLE LXXIX

The same pressure vessel as described in Example VII was charged with 146 g.

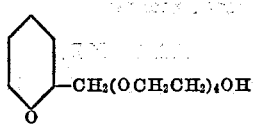

(0.5 mole), 22.95 g. aluminum powder of 88.23% purity (0.75 mole), 40.25 g. sodium (1.75 moles), and 600 ml. toluene. The reaction and isolation were carried out in a manner similar to that of Example LII. The yields were: 151.2 grams of

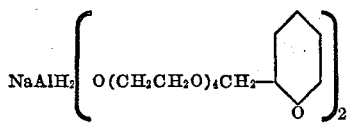

i.e., 95.4% of the theory, and 53.4 g. of a solid extraction residue, which was found to contain 93% of $Na_3AlH_6$, i.e., 97.45% of the theoretical value.

The starting compound

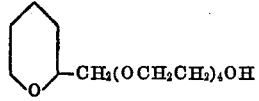

was prepared in the usual manner from

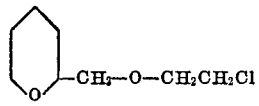

and $Na(OCH_2CH_2)_3OH$.

EXAMPLE LXXX

The same pressure vessel as in Example VII was charged with 148 g. $C_2H_5OCH_2 \cdot CH(OH)CH_2OC_2H_5$ (1 mole), 15.3 g. aluminum powder 88.23% pure (0.5 mole), 11.5 g. sodium (0.5 mole), and 600 ml. benzene. The reaction and isolation were carried out in a similar manner to that of Example X. The reaction yielded 169.2 g.

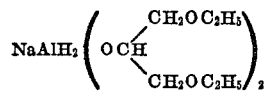

i.e., 97.8% of the theory.

EXAMPLE LXXXI

The same pressure vessel as described in Example VII was charged with 104 g.

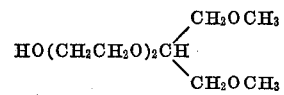

(0.5 moles), 22.95 g. aluminum powder 88..23% (0.75 mole), 40.25 g. sodium (1.75 moles), and 600 ml. benzene. The reaction and isolation were carried out in a manner similar to that of Example LII.

The yields were: 113.4 g.

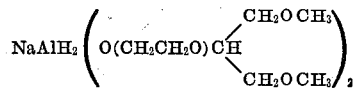

i.e., 97.3% of the theoretical value, and 54.1 g. of a solid extraction residue, which was found to contain 90.6% of $Na_3AlH_6$, i.e., 96.1% of the theoretical yield.

The starting compound

was prepared in the usual manner from $ClCH_2CH_2OCH_2CH_2OH$

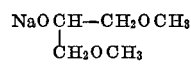

The present invention is useful also for producing sodium aluminum hydrides of the type described, in connection with the different method of the above-mentioned application Ser. No. 594,571 assigned to the same assignee as the instant case. These compounds comprise, for example,

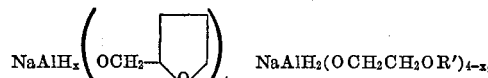

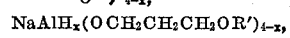

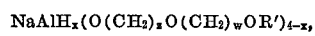

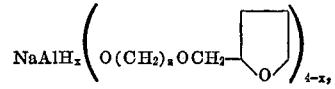

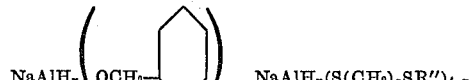

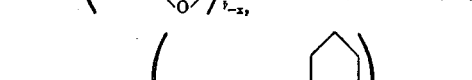

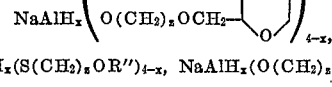

$NaAlH_x(S(CH_2)_zOR'')_{4-x}$, $NaAlH_x(O(CH_2)_zSR'')_{4-x}$ $NaAlH_x(O(CH_2)_zNR''R''')_{4-x}$ wherein R″ and R‴ are each selected from the group consisting of $R'O(CH_2)_z$— and R′, and wherein R′ is selected from the group consisting of alkyls with 1–4 carbon atoms and aryls with 6–8 carbon atoms, and wherein $x$ is an integer between 1 and 3, inclusive, and $z$ and $w$ are each selected from the group of integers between 2 and 4, inclusive.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims.

What is claimed is:

1. A liquid reactant for use in reducing and dehalogenating reactions comprising a solution of (a) a compound of the formula $NaAlH_2(OR)_2$ wherein R is

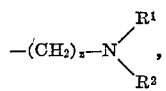

$z$ is 2 to 4 and $R^1$ and $R^2$ are the same or different and are selected from the group consisting of alkyl of 1 to 4 carbon atoms and an aliphatic ether alkyl group having a total of 2 to 4 carbon atoms and $z$ has the same meaning as above, in (b) benzene, toluene, xylene or tetrahydrofuran.

2. A liquid reactant for use in reducing and halogenating reactions comprising (a) a solution of a compound of the formula $NaAlH_x(OR^3)_{4-x}$, wherein $x$ is 1 or 2 and $R^3$ is (alkylene O)$_y R^4$, wherein alkylene has 2 to 4 carbon atoms, $y$ is 1 to 4 and $R^4$ is selected from the group consisting of alkyl of 1 to 4 carbon atoms, phenyl,

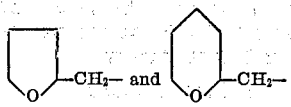

in (b) benzene, toluene, xylene or (b) tetrahydrofuran.

3. A liquid reactant for use in reducing and dehalogenating reactions, comprising (a) a solution of sodium dihydro-bis-(2-methoxy-ethoxy)-aluminate of the formula $NaAlH_2(OCH_2CH_2OCH_3)_2$ in (b) benzene, toluene, xylene or tetrahydrofuran.

References Cited

UNITED STATES PATENTS

| | | | |
|---|---|---|---|
| 3,417,119 | 12/1968 | Ehrlich | 252—188 |
| 3,535,261 | 10/1970 | Kobetz et al. | 252—188 |
| 3,652,622 | 3/1972 | Vit et al. | 260—448 AD |
| 3,394,158 | 7/1968 | Chini et al. | 260—448 AD |
| 3,507,895 | 4/1970 | Casensky et al. | 260—448 AD |

OTHER REFERENCES

Ferguson, Textbook of Organic Chemistry, D. Van Nostrand Company, Inc., New York (1958), p. 163.

LEON D. ROSDOL, Primary Examiner

I. GLUCK, Assistant Examiner

U.S. Cl. X.R.

260—448 AD; 423—646; 252—192, 193